(12) United States Patent
Yamaguchi

(10) Patent No.: US 9,842,399 B2
(45) Date of Patent: Dec. 12, 2017

(54) IMAGE PROCESSING DEVICE AND IMAGE PROCESSING METHOD

(71) Applicant: FUJITSU LIMITED, Kawasaki-shi, Kanagawa (JP)

(72) Inventor: Nobuyasu Yamaguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 4 days.

(21) Appl. No.: 15/138,644

(22) Filed: Apr. 26, 2016

(65) Prior Publication Data

US 2016/0364853 A1 Dec. 15, 2016

(30) Foreign Application Priority Data

Jun. 10, 2015 (JP) ................................ 2015-117769

(51) Int. Cl.
  *G06K 9/00* (2006.01)
  *G06T 7/00* (2017.01)
  *G06T 7/70* (2017.01)
(52) U.S. Cl.
  CPC .......... *G06T 7/004* (2013.01); *G06K 9/00671* (2013.01); *G06T 7/70* (2017.01); *G06T 7/97* (2017.01); *G06T 2207/10028* (2013.01); *G06T 2207/30244* (2013.01)
(58) Field of Classification Search
  CPC .. G06T 7/004; G06T 7/97; G06T 7/70; G06T 7/285; G06T 19/003; G06K 9/00671
  USPC ....................................................... 382/103
  See application file for complete search history.

(56) References Cited

U.S. PATENT DOCUMENTS

| 6,775,403 | B1 | 8/2004 | Ban et al. |
| 8,953,847 | B2 * | 2/2015 | Moden ................ G06T 7/0042 382/103 |
| 2007/0253618 | A1 * | 11/2007 | Kim ........................ G06T 7/80 382/154 |

(Continued)

FOREIGN PATENT DOCUMENTS

| JP | 2000-293687 | 10/2000 |
| JP | 2012-68772 | 4/2012 |
| WO | WO 2014/152254 A2 | 9/2014 |

OTHER PUBLICATIONS

Extended European Search Report dated Nov. 14, 2016 in Patent Application No. 16167883.4.
(Continued)

*Primary Examiner* — Van D Huynh
(74) *Attorney, Agent, or Firm* — Oblon, McClelland, Maier & Neustadt, L.L.P.

(57) ABSTRACT

A device includes a memory configured to store map point information including a first map point group indicating a three-dimensional position of an object measured by a distance sensor and a second map point group indicating a three-dimensional position of the object determined based on captured images and a processor configured to compare a first projection point group of the first map point group with a feature point group extracted from a new captured image, create pairs of a feature point in the feature point group and a first projection point that is similar to the feature point, when the number of the pairs is less than or equal to a threshold, compare a second projection point group of the second map point group with the feature point group, create other pairs of the feature point and a second projection point, and estimate a position and attitude of a camera.

18 Claims, 15 Drawing Sheets

(56) References Cited

U.S. PATENT DOCUMENTS

2013/0265392 A1* 10/2013 Rhee .................. G06F 3/005
  348/46
2016/0227193 A1    8/2016 Osterwood et al.

OTHER PUBLICATIONS

Salvatore Livatino et al: "3-D Integration of Robot Vision and Laser Data with Semiautomatic Calibration in Augmented Reality Stereoscopic Visual Interface", IEEE Transactions On Industrial Informatics, IEEE Service Center, vol. 8, No. 1, XP011398096, Feb. 2012, pp. 69-77.

* cited by examiner

FIG. 4

| IDENTIFICATION NUMBER | THREE-DIMENSIONAL COORDINATE | TYPE | FEATURE AMOUNT | IMAGE PATTERN TEMPLATE |
|---|---|---|---|---|
| 1 | (x1, y1, z1) | 3D DISTANCE SENSOR | (M11, M12, ...,M1n) | PartImage1 |
| 2 | (x2, y2, z2) | 3D DISTANCE SENSOR | (M21, M22, ...,M2n) | PartImage2 |
| 3 | (x3, y3, z3) | STEREO | (M31, M32, ...,M3n) | PartImage3 |
| 4 | (x4, y4, z4) | STEREO | (M41, M42, ...,M4n) | PartImage4 |
| 5 | (x5, y5, z5) | 3D DISTANCE SENSOR | (M51, M52, ...,M5n) | PartImage5 |
| 6 | (x6, y6, z6) | STEREO | (M61, M62, ...,M6n) | PartImage6 |
| 7 | (x7, y7, z7) | 3D DISTANCE SENSOR | (M71, M72, ...,M7n) | PartImage7 |
| 8 | (x8, y8, z8) | STEREO | (M81, M82, ...,M8n) | PartImage8 |
| ⋮ | ⋮ | ⋮ | ⋮ | ⋮ |

RELATED ART

RELATED ART

RELATED ART

IMAGE PROCESSING DEVICE AND IMAGE PROCESSING METHOD

CROSS-REFERENCE TO RELATED APPLICATION

This application is based upon and claims the benefit of priority of the prior Japanese Patent Application No. 2015-117769, filed on Jun. 10, 2015, the entire contents of which are incorporated herein by reference.

FIELD

The embodiment discussed herein is related to an image processing device and an image processing method.

BACKGROUND

There is a technology of calculating a position and attitude of a camera with respect to a captured image, based on the captured image from the camera mounted on a personal computer (PC), a mobile terminal, or the like. Further, there is an augmented reality (AR) technology of achieving support of user's operation by using a position and attitude of a camera to superimpose and display additional information such as computer graphics (CG) on a captured image displayed on a screen of a PC, a mobile terminal, or the like.

FIG. 11 is a diagram illustrating an example of the AR technology. As illustrated in FIG. 11, for example, when a user uses a camera incorporated in a mobile terminal 10 to capture a marker 11 and an inspecting object 12, object information 13 of the marker 11 is displayed on a display screen 10a of the mobile terminal 10.

As a technology of calculating a position and attitude of a camera, there is a first conventional art of using a feature point contained in a captured image. A feature point is detected based on the fact that an intensity variation is larger near a target point and a position of the target point on an image is uniquely defined by the intensity variation. In the first conventional art, a three-dimensional coordinate set of feature points that have been generated in advance is used. In the following description, three-dimensional coordinates of a feature point is referred to as a map point, and a set of map points is referred to as an initial map. For example, in the first conventional art, a position and attitude of camera is estimated by associating feature points present in a current captured image with map points projected on the captured image.

FIG. 12 is a diagram for illustrating the first conventional art that calculates a position and attitude of a camera. In the example of FIG. 12, there are map points $S_1$ to $S_6$. A particular map point $S_i$ is expressed by Formula (1) in the global coordinate system. There are assumed to be feature points $x_1$ to $x_6$ on a capture image 20. A particular feature point $x_i$ is expressed by Formula (2) in a camera coordinate system. Map points projected on the capture image 20 are designated as projection points $p_1'$ to $p_6'$. A particular projection point is expressed by Formula (3) in the camera coordinate system.

$$S_i=(x,y,z) \quad (1)$$

$$x_i=(u,v) \quad (2)$$

$$p_i'=(u',v') \quad (3)$$

For example, in the first conventional art, a position and attitude of a camera is found by calculating a camera position and attitude matrix M whose sum of squares E calculated by Formula (4) is the least.

$$E = \sum_i |P_i - x_i|^2 \quad (4)$$

Next, the first conventional art of generating an initial map will be described. FIG. 13 is a diagram for illustrating the first conventional art of generating an initial map. For example, in the first conventional art, the principle of stereo capturing is used. The first conventional art associates the same feature points with each other one after another between two captured images taken by changing the capturing position. Based on a positional relationship of a plurality of the associated corresponding points in each captured image, the first conventional art generates an initial map in which the corresponding points form map points.

In the example illustrated in FIG. 13, a recovered map point is represented as $S_i$, and a point at which a line segment between an initial capturing position Ca of a camera and the map point $S_i$, intersects with a first captured image 20a is represented as a feature point $x_{ai}$. A point at which a line segment between a second capturing position Cb of the camera and the map point $S_i$ intersects with a second captured image 20b is represented as a feature point $x_{bi}$. Then, the resultant corresponding points will be the feature point $x_{ai}$ and the feature point $x_{bi}$.

A camera position and a capturing orientation of the first captured image are generally used as the origin of three-dimensional coordinates for an initial map. FIG. 14 is a diagram illustrating an example of a definition of a capturing orientation of a camera. As illustrated in FIG. 14, for example, the origin of a three-dimensional coordinate system of an initial map is defined based on a position ($T_x$, $T_y$, $T_z$) and a capturing orientation ($R_x$, $R_y$, $R_z$) of a camera C10 as a reference.

Here, in the first conventional art that uses an initial map to calculate a camera position and attitude, first to fourth optimum conditions described below apply, in principle. The first optimum condition provides that a higher accuracy of three-dimensional coordinates of map points improves the estimation accuracy of a camera position and attitude. Thus, two captured images used for stereo capturing may often be retaken for many times.

The second optimum condition provides that the closer to a camera a feature point that matches a map point is, the more the estimation accuracy of a camera position is improved. This is because a feature point of the captured object which is closer to a camera allows for a higher relative resolution of the camera and therefore the accuracy of positions of feature points in a captured image is improved.

The third optimum condition provides that more map points improves the estimation accuracy of a camera position and attitude. The fourth optimum condition provides that a wider expansion in a distribution of map points improves the estimation accuracy of a camera position and attitude.

In principle, with five or eight map points which match feature points, a camera position and attitude can be estimated and therefore the conventional art uses map points as many as possible by prioritizing the third and fourth optimum conditions without taking the second optimum condition into account. For example, the art related to attitude estimation of a camera is disclosed in Japanese Laid-open Patent Publication No. 2012-68772.

On the other hand, 3D distance sensors that can acquire three-dimensional coordinates of an object in real time have been prevalent. In particular, by setting both a 3D distance sensor and a camera and making correction of a positional relationship to each other, three-dimensional coordinates of each feature point of a captured image of the camera can be calculated in real time. With the use of the 3D distance sensor, three-dimensional coordinates of a map point can be defined at the time of detection of a feature point in the first captured image when generating an initial map and, furthermore, the position accuracy of a map point is higher than the position accuracy of a map point resulted from stereo capturing. For example, the related art is disclosed in Japanese Laid-open Patent Publication No. 2000-293687.

SUMMARY

According to an aspect of the invention, an image processing device includes a memory configured to store map point information including a first map point group indicating a three-dimensional position of an object measured by a distance sensor and a second map point group indicating a three-dimensional position of the object determined based on a plurality of captured images and a processor coupled to the memory and configured to: acquire a new captured image including the object, compare a first projection point group with a feature point group extracted from the new captured image, the first projection point group being obtained by projecting the first map point group on the new captured image, create pairs of a feature point in the feature point group and a first projection point that is similar to the feature point, when the number of the pairs is less than or equal to a threshold, compare a second projection point group with the feature point group, the second projection point group being obtained by projecting the second map point group on the new captured image, create other pairs of the feature point and a second projection point that is similar to the feature point, and estimate a position and attitude of a camera that has captured the new captured image based on the pairs, the other pairs, and the map point information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of data structure of initial map information;

DESCRIPTION OF EMBODIMENT

In the conventional arts, however, there is a problem that the estimation accuracy of a camera position and attitude is degenerated.

In the first conventional art, there is a problem that generation of an initial map by using stereo capturing described above results in a poor accuracy in the z-axis direction in principle. Although there is an attempt to improve the accuracy through advancement of a calculation scheme, no effective solution has been achieved.

Further, for example, a 3D distance sensor has a limited measurable distance from a camera and thus there is a problem that the distance at which three-dimensional coordinates can be measured with high accuracy is short. Further, there is a problem with a 3D distance sensor that measurement is difficult when the color of an object is close to black or when the material is less likely to reflect a light. Therefore, when a 3D distance sensor is used instead of the first conventional art, the number of points that can be used as map points may be reduced for some object, the third and fourth optimum conditions may not be satisfied, and thus the estimation accuracy of a camera position and attitude may rather be degenerated.

Figure 15:
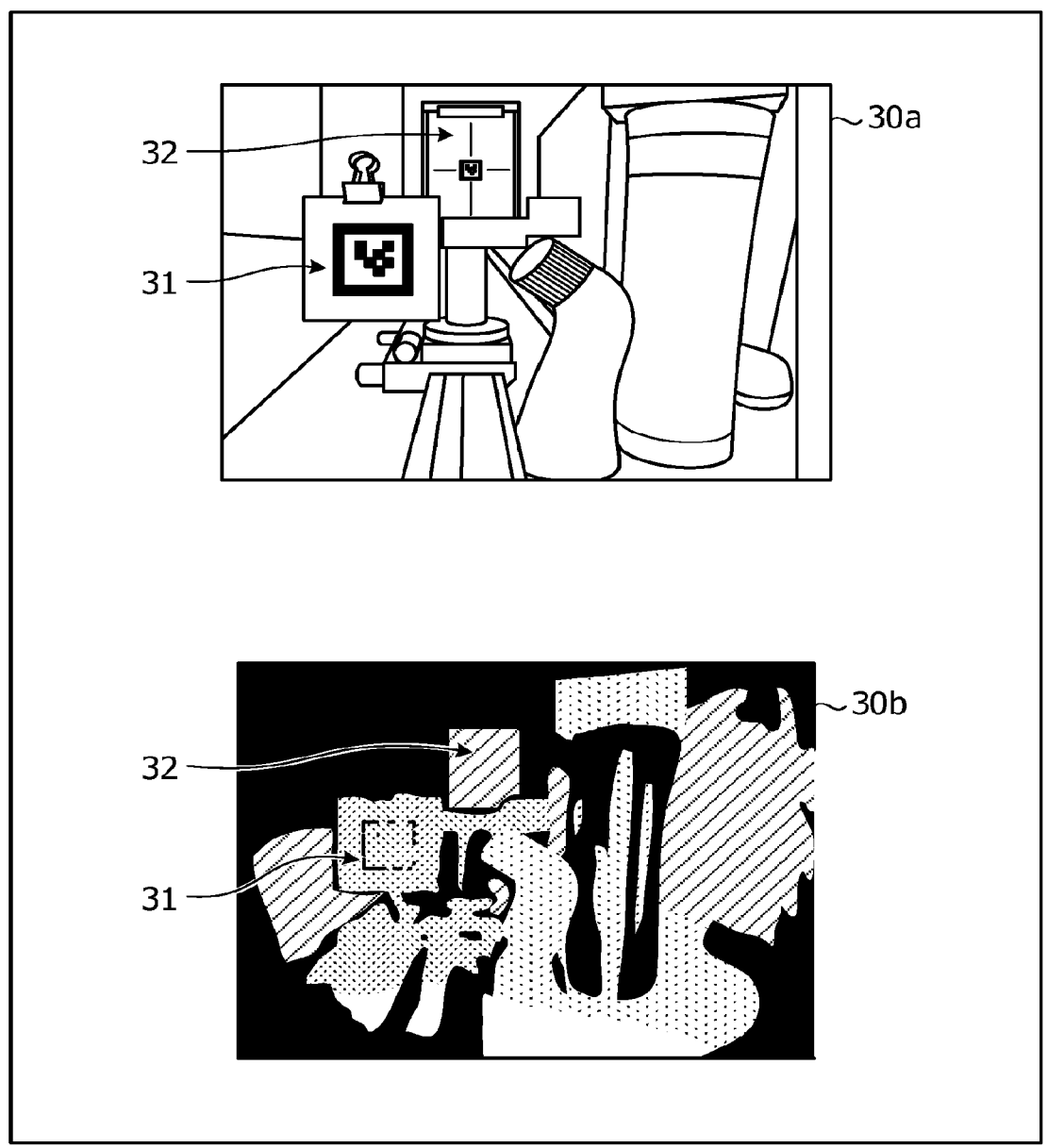
FIG. 15 is a diagram illustrating an example of a 3D distance image measured by a 3D distance sensor.

FIG. 15 is a diagram illustrating an example of a 3D distance image measured by a 3D distance sensor. In FIG. 15, an image 30a is a captured image taken by a camera. An image 30b is a 3D distance image measured by a 3D distance sensor corresponding to the image 30a. In the image 30b, black areas indicate areas that are not detected by the 3D distance sensor. Further, in the image 30b, a whiter image is captured for a closer object. For example, an object 31 is an object distant by 40 cm from the camera, and an object 32 is an object distant by 140 cm from the camera.

In one aspect, the present embodiment is intended to provide an image processing device, an image processing method, and an image processing program that can improve the estimation accuracy of a position and attitude of a camera.

Hereinafter, an embodiment of an image processing device, an image processing method, and an image processing program disclosed by the present application will be described based on the drawings. Note that the disclosure is not intended to be limited by this embodiment.

First Embodiment

Figure 1:
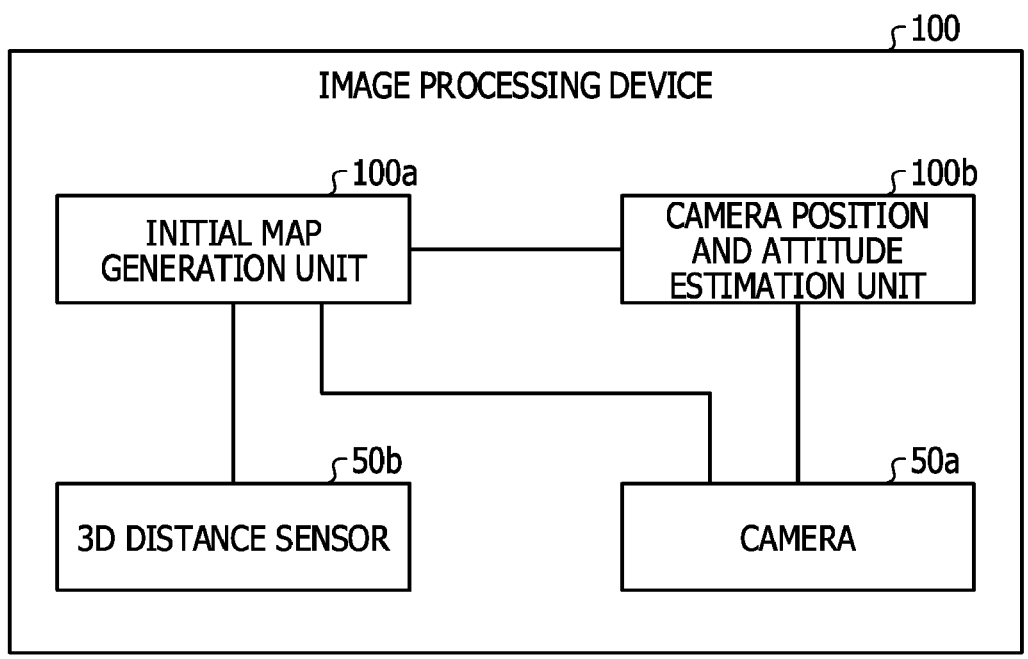
FIG. 1 is a functional block diagram illustrating a configuration of an image processing device according to the present embodiment.

FIG. 1 is a functional block diagram illustrating a configuration of an image processing device according to the present embodiment. As illustrated in FIG. 1, the image processing device 100 has a camera 50a, a 3D distance sensor 50b, an initial map generation unit 100a, and a camera position and attitude estimation unit 100b.

The camera 50a is a device that captures an image. An image that the camera 50a captured is referred to as a captured image. The camera 50a outputs information of captured images to the initial map generation unit 100a and the camera position and attitude estimation unit 100b. The camera 50a is able to move to a plurality of positions and captures images at a capturing position Ca and a capturing position Cb, for example. A user may manually change the capturing position of the camera 50a, or the image processing device 100 may automatically change the capturing position of the camera 50a.

The 3D distance sensor 50b is a sensor that acquires a 3D distance image including information of a distance between the 3D distance sensor 50b and an object within a measurable range of the 3D distance sensor 50b. The 3D distance sensor 50b outputs information of a 3D distance image to the initial map generation unit 100a. For example, a 3D distance image that the 3D distance sensor 50b captures corresponds to a captured image that the camera 50a captured at the capturing position Ca.

The initial map generation unit 100a is a processing unit that generates initial map information that is a set of map points. A map point corresponds to three-dimensional coordinates of a feature point. The initial map generation unit 100a utilizes both a process of obtaining map points through stereo capturing by using the camera 50a and a process of obtaining map points through a 3D distance image captured by the 3D distance sensor 50b. The initial map generation unit 100a outputs initial map information to the camera position and attitude estimation unit 100b.

In the following description, a map point obtained by using a 3D distance image captured by the 3D distance sensor 50b is referred to as "first map point", and a map point obtained through stereo capturing by using the camera 50a is referred to as "second map point". Further, when not intended to be distinguished from each other, the first map point and the second map point are simply referred to as a map point.

In general, the accuracy in three-dimensional coordinates is higher in the first map point than in the second map point. Thus, the initial map generation unit 100a saves information of the first map points in initial map information prior to information of the second map points. Further, when saving information of map points in initial map information, the initial map generation unit 100a also saves, in the initial map information, information as to whether the map point is the first map point obtained by using a 3D distance image or the second map point obtained by using stereo capturing.

The camera position and attitude estimation unit 100b uses the first map points prior to the second map points to compare first projection points obtained by projecting the first map points on a captured image with feature points on the captured image and performs matching to create pairs of a first projection point and a feature point that are similar.

The camera position and attitude estimation unit 100b estimates the position and attitude of the camera 50a based on a matching result and initial map information.

Note that, when the number of pairs of the first projection point and the feature point that are similar is less than a threshold, the camera position and attitude estimation unit 100b compares second projection points obtained by projecting the second map points on the captured image with the feature points on the capture image. The camera position and attitude estimation unit 100b compensates the deficiency in the number of pairs with the second map points by creating pairs of a second projection point and a feature point that are similar.

The camera position and attitude estimation unit 100b performs matching of the projection points and the feature points by prioritizing and using the first map points that are of hither accuracy and compensating the deficiency with the second map points, and therefore can improve the estimation accuracy of the position and attitude of the camera 50a.

Figure 2:
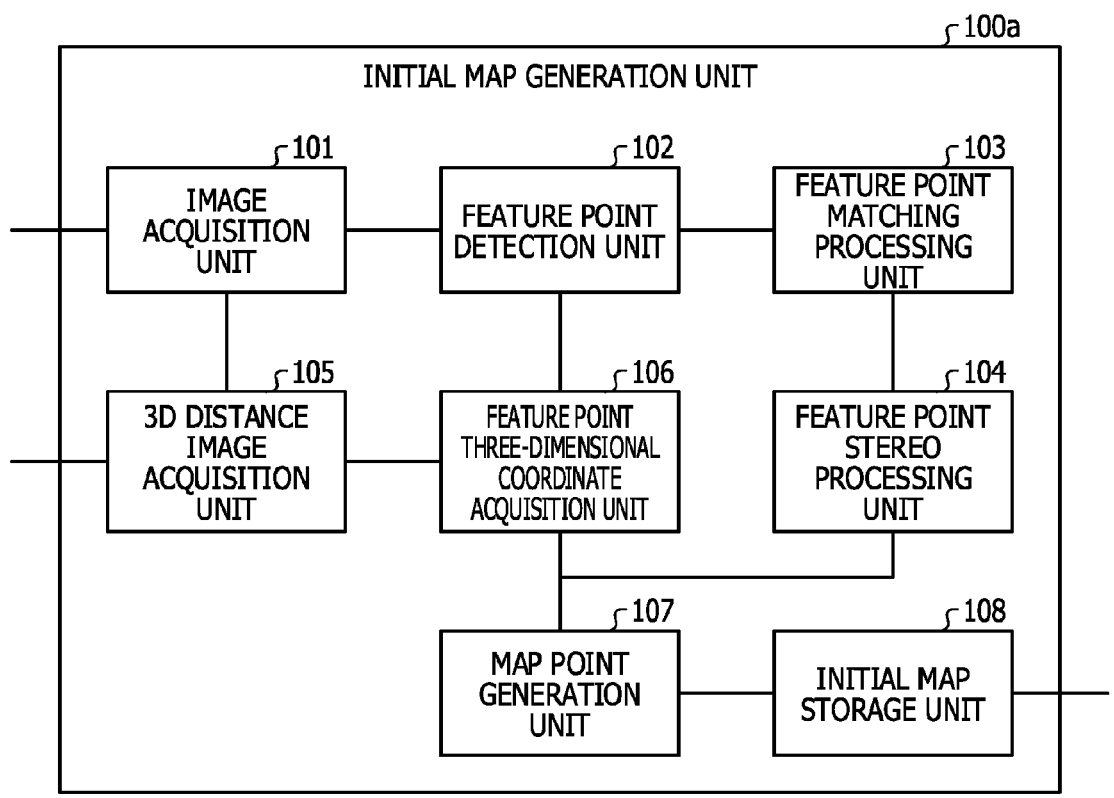
FIG. 2 is a functional block diagram illustrating a configuration of an initial map generation unit according to the present embodiment.

Next, the configuration of the initial map generation unit illustrated in FIG. 1 will be described. FIG. 2 is a functional block diagram illustrating the configuration of the initial map generation unit according to the present embodiment. As illustrated in FIG. 2, the initial map generation unit 100a has an image acquisition unit 101, a feature point detection unit 102, a feature point matching processing unit 103, and a feature point stereo processing unit 104. Further, the initial map generation unit 100a has a 3D distance image acquisition unit 105, a feature point three-dimensional coordinate acquisition unit 106, a map point generation unit 107, and an initial map storage unit 108.

The image acquisition unit 101 is a processing unit that acquires information of captured images from the camera 50a. Since the initial map generation unit 100a determines the second map point by using the principle of stereo capturing, the image acquisition unit 101 acquires two captured images whose capturing positions of the camera 50a are different. The capturing position of the camera 50a may be automatically set by the image acquisition unit 101 or may be manually set by the user. The image acquisition unit 101 outputs information of captured images to the feature point detection unit 102 and the 3D distance image acquisition unit 105.

Figure 3:
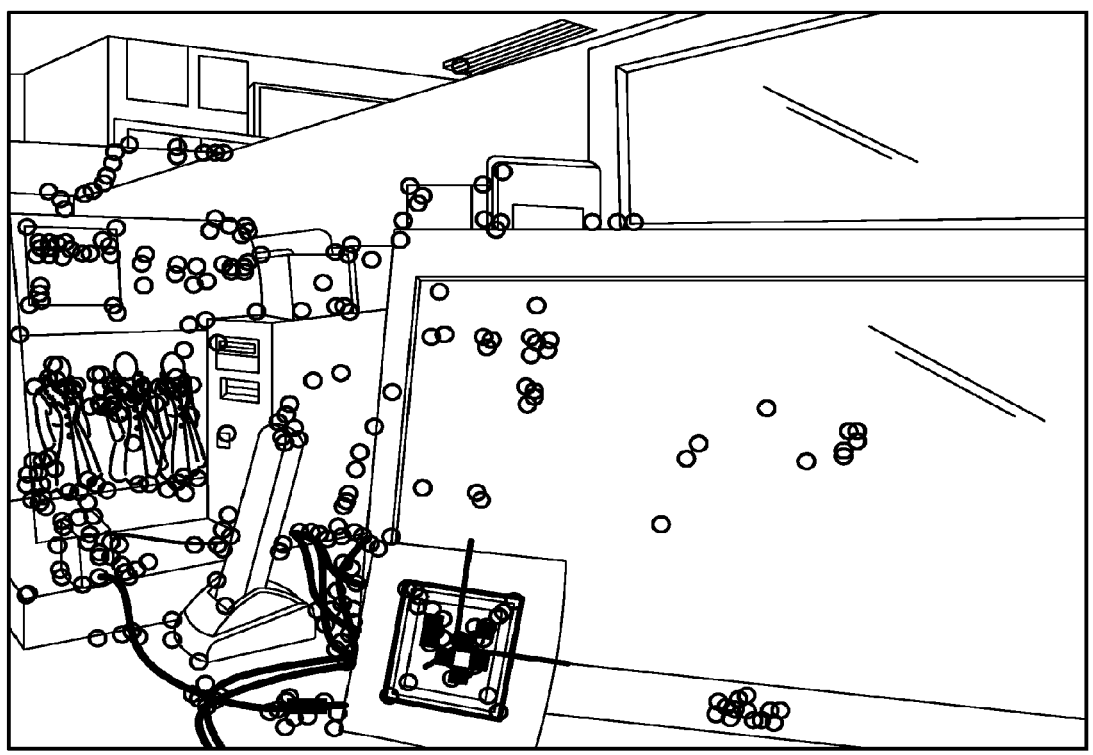
FIG. 3 is a diagram illustrating an example of feature points detected from a captured image.

The feature point detection unit 102 is a processing unit that detects feature points from a captured image. For example, the feature point detection unit 102 detects feature points based on the fact that an intensity variation is larger near a target point and a position of the target point on an image is uniquely defined by the intensity variation. A feature point often corresponds to a corner of an object. FIG. 3 is a diagram illustrating an example of feature points detected from a captured image. In the example illustrated in FIG. 3, circle marks indicate feature points.

The feature point detection unit 102 outputs information of feature points to the feature point matching processing unit 103 and the feature point three-dimensional coordinate acquisition unit 106. For example, information of a feature point will be information that associates information identifying a feature point on the captured image, coordinates of the feature point, and information of pixels around the feature point. The feature point detection unit 102 outputs, to the feature point matching processing unit 103, information of the first feature points detected from a captured image taken at the capturing position Ca and information of the second feature points detected from a captured image taken at the capturing position Cb.

The feature point matching processing unit 103 is a processing unit that compares information of the first feature points with information of the second feature points and, in detecting the same location of an object, performs matching of feature points that are similar to each other to create pairs of feature points. The feature point matching processing unit 103 outputs information of the pair of the matched feature points to the feature point stereo processing unit 104. For example, the information of the pair of feature points includes information identifying feature points to be paired and the coordinates of feature points to be paired.

For example, when a difference between the coordinates of the first feature point and the second feature point is less than a threshold and a difference between the pixel values around the first feature point and the pixel values around the second feature point is less than a threshold, the feature point matching processing unit 103 pairs the first feature point and the second feature point as a pair of feature points.

The feature point stereo processing unit 104 is a processing unit that calculates the three-dimensional coordinates of the feature point based on information of a pair of feature points and the principle of stereo capturing. The three-dimensional coordinates of the feature points calculated by the feature point stereo processing unit 104 correspond to the second map points described above.

The feature point stereo processing unit 104 outputs information of the second map points to the map point generation unit 107. The information of the second map points includes the three-dimensional coordinates, a feature amount, and an image pattern template of the second map points. As used herein, the feature amount is a set of pixel values around a feature point on a captured image corresponding to the second map point, the pixel values being arranged in a predetermined order. The image pattern template is an image of a predetermined area including feature points on a captured image corresponding to the second map points.

The 3D distance image acquisition unit 105 is a processing unit that acquires a 3D distance image measured by using the 3D distance sensor 50b. Further, the 3D distance image acquisition unit 105 acquires a captured image taken at the capturing position Ca of the camera 50a. The 3D distance image acquisition unit 105 outputs a 3D distance image and a captured image to the feature point three-dimensional coordinate acquisition unit 106.

The feature point three-dimensional coordinate acquisition unit 106 is a processing unit that determines three-dimensional coordinates of a feature point based on information of the feature point, a captured image, and a 3D distance image. For example, the feature point three-dimensional coordinate acquisition unit 106 determines the position of a feature point on a captured image based on information of the feature point and determines the three-dimensional coordinates of the feature point from the determined position of the feature point and a 3D distance image. The three-dimensional coordinates of the feature point determined by the feature point three-dimensional coordinate acquisition unit 106 corresponds to the first map point described above.

The feature point three-dimensional coordinate acquisition unit 106 outputs information of the first map points to the map point generation unit 107. The information of the first map points includes the three-dimensional coordinates of the first map points, a feature amount, and an image pattern template. As used herein, the feature amount is a set of pixel values around a feature point on a captured image corresponding to the first map point, the pixel values being arranged in a predetermined order. The image pattern template is an image of a predetermined area including feature points on a captured image corresponding to the first map points.

The map point generation unit 107 is a processing unit that generates initial map information based on information of the first map points and information of the second map points. The map point generation unit 107 stores initial map information in the initial map storage unit 108.

When generating initial map information, the map point generation unit 107 prioritizes information of the first map points to information of the second map points. For example, when three-dimensional coordinates of the first map point are similar to three-dimensional coordinates of the second map point, the map point generation unit 107 registers information of the three-dimensional coordinates of the first map point to the initial map information. The fact that three-dimensional coordinates of the first map point are similar to three-dimensional coordinates of the second map point indicates that the difference between the three-dimensional coordinates of the first map point and the three-dimensional coordinates of the second map point is less than a threshold, for example.

FIG. 4 is a diagram illustrating an example of data structure of initial map information. As illustrated in FIG. 4, this initial map information associates an identification number, a three-dimensional coordinate, a type, a feature amount, and an image pattern template. The identification number is a number for uniquely identifying a map point. The type is information indicating whether a map point is the first map point or the second map point. When a map point is the first map point, the type is "3D distance sensor". When a map point is the second map point, the type is "stereo". Description for the feature amount and the image pattern template will be the same as the description for the feature amount and the image pattern template described above.

The initial map storage unit 108 is a storage unit that stores initial map information. The initial map generation unit 100a outputs initial map information stored in the initial map storage unit 108 to the camera position and attitude estimation unit 100b.

Figure 5:
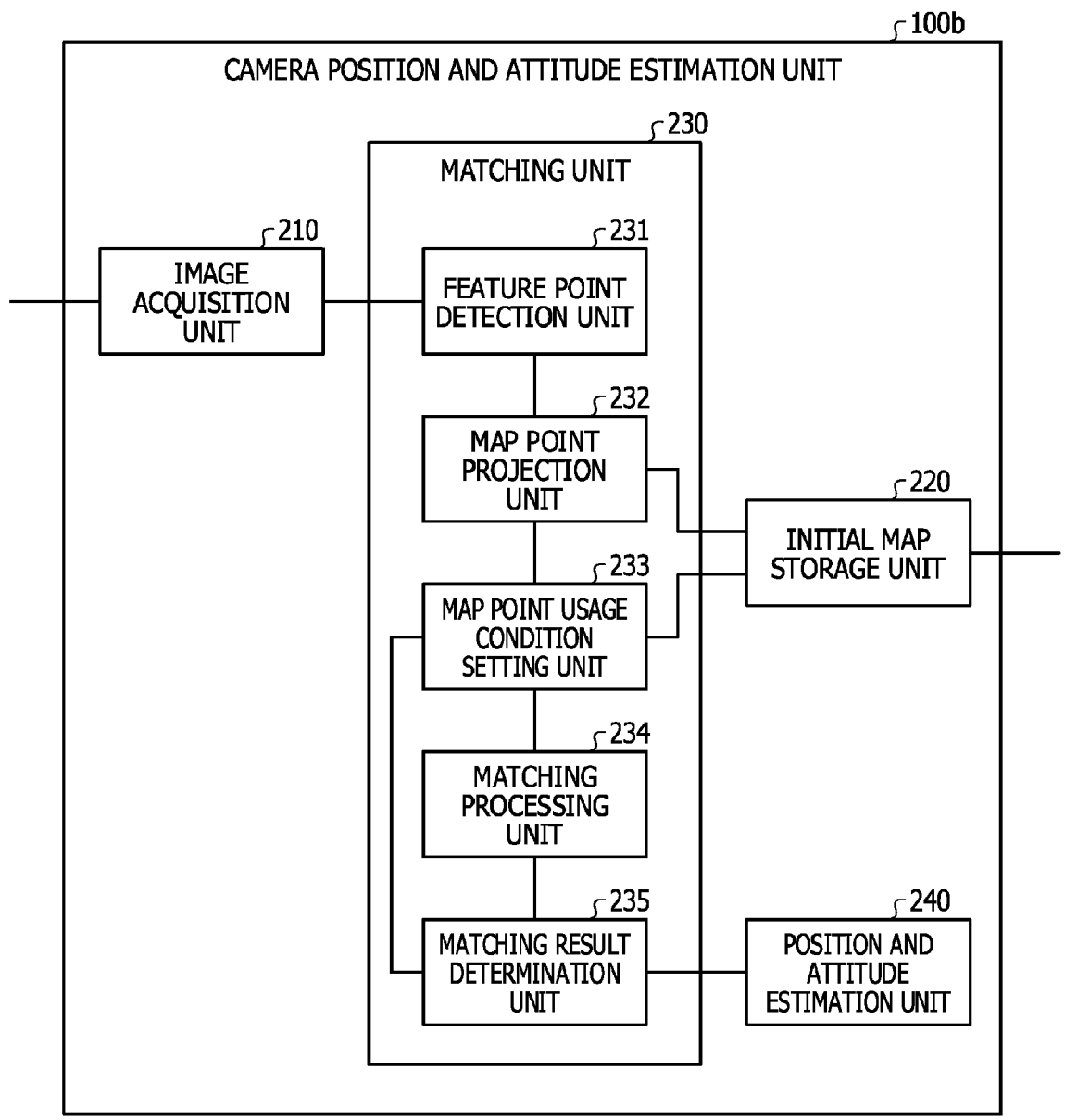
FIG. 5 is a functional block diagram illustrating a configuration of a camera position and attitude estimation unit.

Next, the configuration of the camera position and attitude estimation unit 100b illustrated in FIG. 1 will be described. FIG. 5 is a functional block diagram illustrating the configuration of the camera position and attitude estimation unit. As illustrated in FIG. 5, the camera position and attitude estimation unit 100b has an image acquisition unit 210, an initial map storage unit 220, a matching unit 230, and a position and attitude estimation unit 240.

The image acquisition unit 210 is a processing unit that acquires information of captured images from the camera 50a. The image acquisition unit 210 outputs information of the captured images to the matching unit 230.

The initial map storage unit 220 is a storage unit that stores initial map information illustrated in FIG. 4. The camera position and attitude estimation unit 100b acquires initial map information from the initial map generation unit 100a and stores the acquired initial map information in the initial map storage unit 220.

The matching unit 230 compares the first projection points obtained by projecting the first map points on a captured image with feature points on the captured image to create pairs of a first projection point and a feature point that are similar. Based on the number of the created pairs, the matching unit 230 determines whether or not to perform matching that uses the second map points. When the matching unit 230 has determined to perform matching that uses the second map point, the matching unit 230 compares the second projection points obtained by projecting the second map points on a captured image with feature points on the captured image to create pairs of a second projection point and a feature point that are similar. The matching unit 230 outputs a matching result to the position and attitude estimation unit 240.

The matching unit 230 has a feature point detection unit 231, a map point projection unit 232, a map point usage condition setting unit 233, a matching processing unit 234, and a matching result determination unit 235.

The feature point detection unit 231 is a processing unit that detects feature points from a captured image. The process in which the feature point detection unit 231 detects feature points is the same as the process in which the feature point detection unit 102 detects feature points described above. The feature point detection unit 231 outputs information of feature points and information of captured images to the map point projection unit 232.

The map point projection unit 232 is a processing unit that, by referring to initial map information stored in the initial map storage unit 220, calculates the first projection points obtained by projective-transforming and projecting the first map points on a captured image. The map point projection unit 232 outputs, to the map point usage condition setting unit 233, information of the first projection points included in a captured area of a captured image among a plurality of first projection points. For example, the information of the first projection points includes the two-dimensional coordinates of the first projection points, the three-dimensional coordinates of the first map points corresponding to the first projection points, a feature amount of the first map points, information of the feature points, and information of captured images.

Further, the map point projection unit 232 generates information of the second projection point in response to a request from the map point usage condition setting unit 233. The map point projection unit 232 refers to initial map information and calculates the second projection points obtained by projective-transforming and projecting the second map points on a captured image. The map point projection unit 232 outputs, to the map point usage condition setting unit 233, information of the second projection points included in a captured area of a captured image among a plurality of second projection points. For example, the information of the second projection point includes the two-dimensional coordinates of the second projection points, the three-dimensional coordinates of second map points corresponding to the second projection points, a feature amount of the second map points, information of the feature points, and information of captured images.

The map point usage condition setting unit 233 is a processing unit that selects map points (projection points) to be used in the matching processing unit 234 based on selection conditions. For example, the map point usage condition setting unit 233 uses a first selection condition, a second selection condition, or a third selection condition described later. The map point usage condition setting unit 233 first operates using the first selection condition and then, based on a determination result of the matching result determination unit 235 described later, switches the first selection condition to the second selection condition or the third selection condition for operation.

When a matching result "NO" is accepted from the matching result determination unit 235, the map point usage condition setting unit 233 selects the second selection condition or the third selection condition. For example, when a matching result "NO" is accepted while the first selection condition is in selection, the map point usage condition setting unit 233 selects the second selection condition for operation. When a matching result "NO" is accepted while the second selection condition is in selection, the map point usage condition setting unit 233 selects the third selection condition for operation. Specific examples for the first selection condition, the second selection condition, and the third selection condition will be described below.

The first selection condition is a condition to select the first map points prior to the second map points. The map point usage condition setting unit 233 which is based on the first selection condition outputs the three-dimensional coordinates of the first map points, the two-dimensional coordinates of the first projection points, information of feature points, and information of captured images to the matching processing unit 234.

The second selection condition is a condition to prioritize and select the second map point closer to the camera 50a among a plurality of second map points when selecting the second map points in order to compensate the deficiency in the number of successful matching counts. The map point usage condition setting unit 233 requests information of the second projection points from the map point projection unit 232.

The map point usage condition setting unit 233 which is based on the second selection condition outputs the three-dimensional coordinates of the selected second map points, the two-dimensional coordinates of the second projection points, information of feature points, and information of captured images to the matching processing unit 234. Further, the map point usage condition setting unit 233 outputs to the matching processing unit 234 the three-dimensional coordinates of the first map points and the two-dimensional coordinates of the first projection points in addition to the information of the second map points described above.

In general, the accuracy of three-dimensional coordinates of map points determined by a 3D distance sensor and the principle of stereo capturing is higher in map points closer to the camera 50a at the time of capturing. Therefore, when the second map points are selected, the estimation accuracy of the position and attitude of the camera 50a is improved by selecting the second map points closer to the camera 50a at the time of capturing.

Three-dimensional coordinates of a map point are defined with respect to the capturing position Ca of the camera 50a as the origin that is a position when initial map information was created. In order to calculate a distance from the capturing position Ca to a map point, each three-dimensional coordinate value $P_i$ ($X_i$, $Y_i$, $Z_i$) is first moved and converted into a coordinate value $p_i$ ($x_i$, $y_i$, $z_i$) whose origin is the position of the camera 50a at the time of capturing. The translational component and the rotational component of the camera 50a are used for this conversion. The translational component T is expressed by Formula (5). The rotational component R is expressed by Formula (6). The combination of Formula (5) and Formula (6) corresponds to the camera position and attitude matrix M.

$$\text{translational component } T = (T_x, T_y, T_z) \tag{5}$$

$$\text{rotational component } R = \begin{pmatrix} r0 & r1 & r2 \\ r3 & r4 & r5 \\ r6 & r7 & r8 \end{pmatrix} \tag{6}$$

The relationship between the coordinate value $P_i$ and the coordinate value $p_i$ is represented in Formula (7) using the translational component T and the rotational component R. Therefore, the distance $d_i$ from each map point to the camera at the time of capturing is represented as Formula (8).

$$p_i = R \cdot P_i + T \qquad (7)$$

$$d_i = \|R \cdot P_i + T\| \qquad (8)$$

The map point usage condition setting unit 233 calculates the distance $d_i$ from each second map point to the camera 50a at the time of capturing based on Formula (8) and prioritizes and selects the second map points whose distance $d_i$ is small.

The third selection condition is a condition to select the second map points such that distribution of a plurality of second map points to be selected becomes wider when the second map points are selected in order to compensate the deficiency in the number of successful matching counts. The map point usage condition setting unit 233 requests information of the second projection points from the map point projection unit 232.

The map point usage condition setting unit 233 which is based on the third selection condition outputs the three-dimensional coordinates of the selected second map points, the two-dimensional coordinates of the second projection points, information of feature points, and information of captured images to the matching processing unit 234. Further, the map point usage condition setting unit 233 outputs to the matching processing unit 234 the three-dimensional coordinates of the first map points and the two-dimensional coordinates of the first projection points in addition to the information of the second map points described above.

As described above, a wider distribution of map points improves the estimation accuracy of the position and attitude of the camera 50a. This distribution is not a distribution in a three-dimensional space of three-dimensional coordinate values of map points but is a distribution in two-dimensional coordinate values $p_i'$ ($u_i'$, $v_i'$) of projection points obtained by projecting the three-dimensional values on a screen of a captured image of a camera. The conversion from a three-dimensional value to a two-dimensional value can be expressed by Formula (9). In Formula (9), matrix A is a preset 3×3 perspective transformation matrix.

$$P_i' = \begin{pmatrix} u_i' \\ v_i' \\ 1 \end{pmatrix} = A(R \cdot P_i + T) \qquad (9)$$

The estimation accuracy of the position and attitude of the camera 50a is more improved in the case where two-dimensional coordinate values $p_i'$ of map points are dispersed evenly on the entire captured image than in the case where two-dimensional coordinate values $p_i'$ of map points are not dispersed evenly on the entire captured image. Here, there are various methods for evaluating a distribution state of two-dimensional coordinate values, and any method may be chosen. For example, there is a method of calculating the center of gravity (ug, vg) of two-dimensional coordinate values and using the position of this center of gravity within the image and a dispersion SDd of each two-dimensional coordinate value from the center of gravity. The map point usage condition setting unit 233 calculates the center of gravity (ug, vg) based on Formula (10). The map point usage condition setting unit 233 calculates the distance dispersion SDd based on Formula (11). In Formula (10) and Formula (11), N represents the number of two-dimensional coordinates of map points located within a captured image.

$$(ug, vg) = \frac{1}{N} \sum_i (u_i, v_i) \qquad (10)$$

$$SDd = \frac{1}{N} \sum_i \{(u_i - ug)^2 + (v_i - vg)^2\} \qquad (11)$$

The map point usage condition setting unit 233 selects the predetermined number of second map points and calculates the distance dispersion SDd based on two-dimensional coordinate values of the selected second map points, Formula (10), and Formula (11). When the distance dispersion SDd is greater than or equal to a reference value $SD_{min}$, the map point usage condition setting unit 233 outputs information of the selected second map points to the matching processing unit 234.

On the other hand, when the distance dispersion SDd is less than the reference value $SD_{min}$, the map point usage condition setting unit 233 prioritizes and selects the second map points having a longer distance $D_i$ from the two-dimensional coordinates of the map point to the center of gravity. The map point usage condition setting unit 233 calculates a distance based on Formula (12). After selecting map points, the map point usage condition setting unit 233 repeatedly performs the processes described above.

$$D_i = \sqrt{(u_i - ug)^2 + (v_i - vg)^2} \qquad (12)$$

Note that, for more accurately identifying a distribution state of map points, the map point usage condition setting unit 233 may divide a captured image into a plurality of blocks in a matrix manner and determine the number and distribution of map points for each of the blocks individually and, as occasion calls, may perform a process of adding map points.

Figure 6:
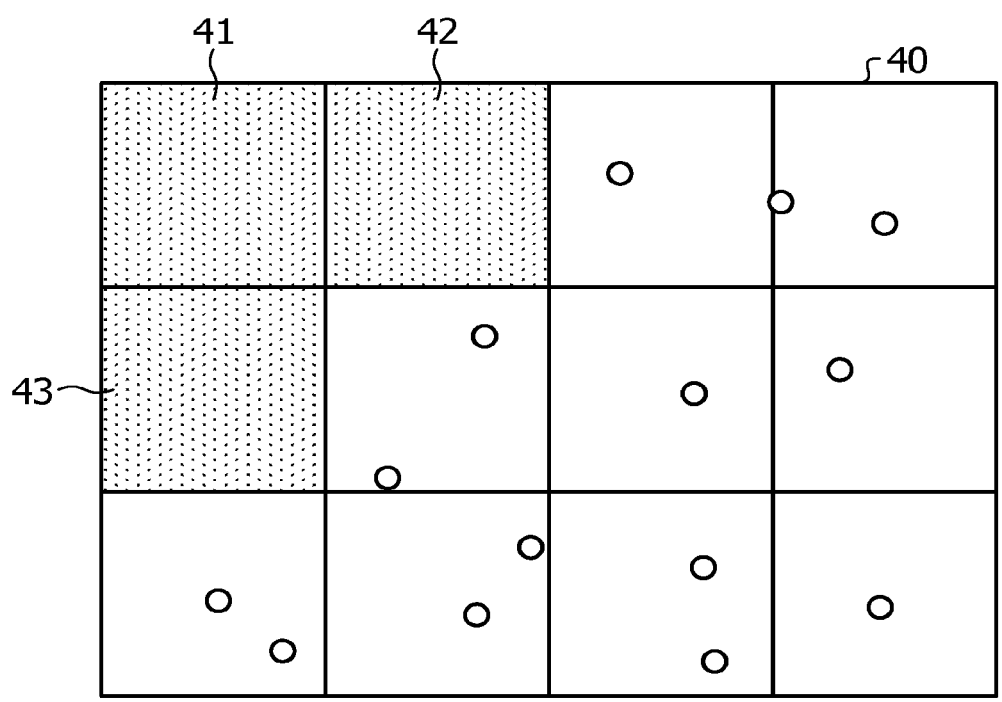
FIG. 6 is a diagram illustrating an example of a determination method of a distribution state of map points.

FIG. 6 is a diagram illustrating an example of a determination method of a distribution state of map points. As illustrated in FIG. 6, the predetermined number of map points do not exist in blocks 41, 42, and 43 of a captured image 40. Therefore, the map point usage condition setting unit 233 refers to initial map information to select the second map points (second projection points) included in the blocks 41, 42, and 43. Further, the map point usage condition setting unit 233 may determine whether or not the distance dispersion SDd is less than the reference value $SD_{min}$ on a block basis for other blocks and perform a process of selecting the second map points on a block basis.

The matching processing unit 234 is a processing unit that creates pairs of a projection point and a feature point by comparing feature points in a captured image with projection points of map points and performing matching of the feature point and the projection point that are similar. The matching processing unit 234 outputs information of pairs of a projection point and a feature point to the matching result determination unit 235. The information of pairs of a projection point and a feature point includes sets of the coordinates of the feature point and the coordinates of the projection point that are paired and information of map points corresponding to the projection points.

For example, the matching processing unit 234 selects a projection point and a feature point which have the closest coordinates, compares a feature amount of the map points corresponding to the selected projection points with a feature amount that is based on pixel values around the feature points, and, when the difference of the feature amounts is less than a threshold, pairs the selected projection point and feature point.

Further, when the first map point and the second map point exist in map points, the matching processing unit 234 selects a projection point of the first map point prior to a projection point of the second map point to be paired with a feature point. For example, when the distance between a certain feature point and a first projection point is the same as the distance between the certain feature point and a second projection point, the certain feature point and the first projection point may be paired.

The matching result determination unit 235 is a processing unit that determines good or not of a matching result when information of pairs of a projection point and a feature point from the matching processing unit 234 has been acquired. When a matching result is determined to be "good", the matching result determination unit 235 outputs information of pairs of a projection point and a feature point to the position and attitude estimation unit 240. On the other hand, when a matching result is determined to be "no good", the matching result determination unit 235 outputs the matching result "no good" to the map point usage condition setting unit 233.

An example of the process in the matching result determination unit 235 will be described. When the matching result determination unit 235 has acquired information of pairs of a projection point and a feature point and when the number of pairs is less than a predetermined number $N_{min}$, the matching result determination unit 235 determines that the matching result is "no good".

Moreover, the matching result determination unit 235 may calculate the distance dispersion SDd based on Formula (11) described above. When the distance dispersion SDd is less than the reference value $SD_{min}$, the matching result determination unit 235 determines that the matching result is "no good".

The position and attitude estimation unit 240 is a processing unit that, when it has acquired information of pairs of a projection point and a feature point from the matching result determination unit 235, estimates the position and attitude of the camera 50a based on the information of pairs of a projection point and a feature point and initial map information.

For example, the position and attitude estimation unit 240 calculates the position and attitude of the camera 50a by calculating the camera position and attitude matrix M such that the sum of squares E calculated with Formula (4) described above is the least. The position and attitude estimation unit 240 outputs information of the calculated position and attitude of the camera 50a.

Figure 7:
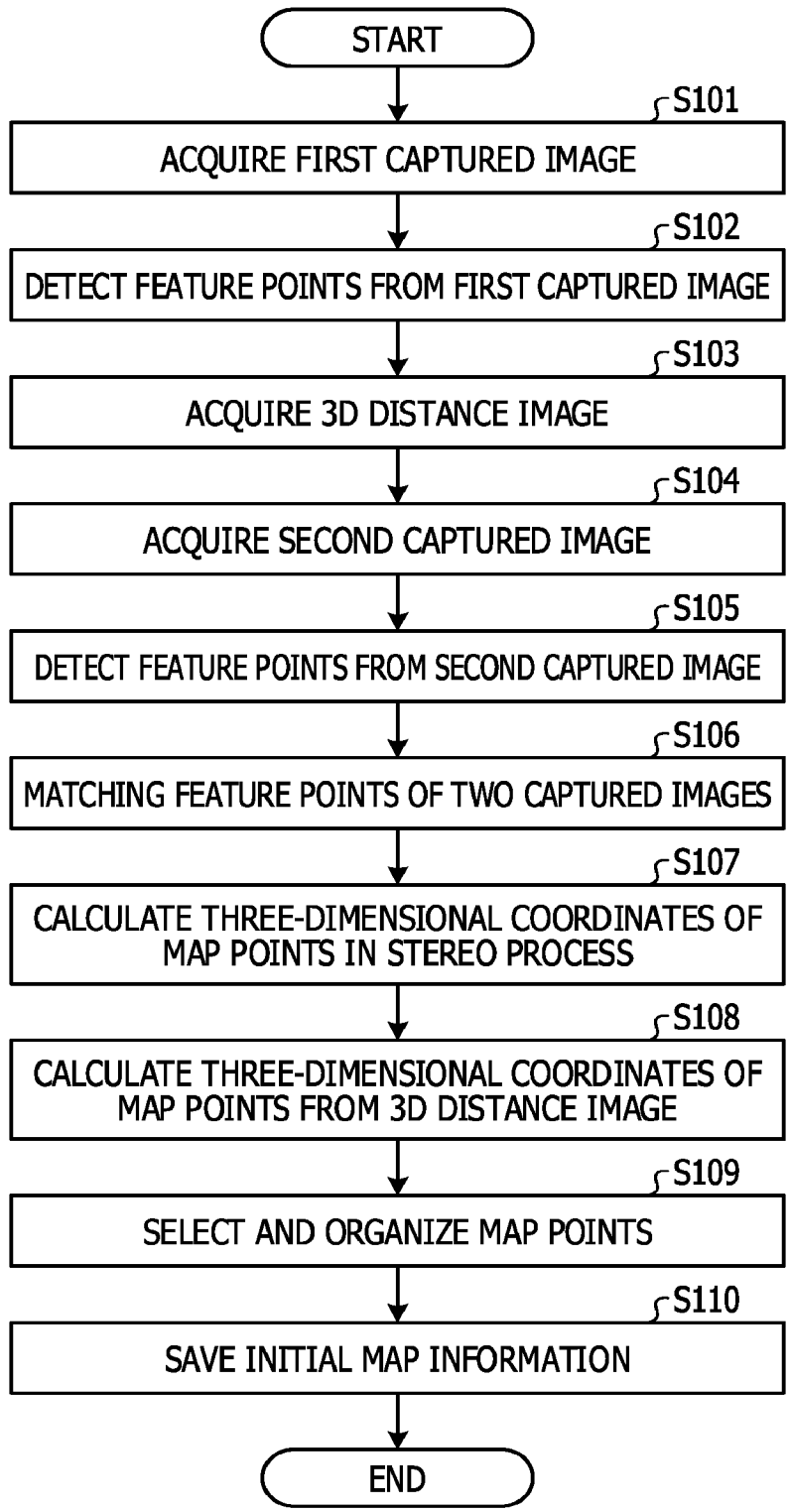
FIG. 7 is a flowchart illustrating an operation procedure of the initial map generation unit according to the present embodiment.

Next, an operation procedure of the initial map generation unit 100a according to the present embodiment will be described. FIG. 7 is a flowchart illustrating the operation procedure of the initial map generation unit according to the present embodiment. As illustrated in FIG. 7, the image acquisition unit 101 of the initial map generation unit 100a acquires a first captured image (step S101). For example, the first captured image corresponds to a captured image taken by the camera 50a at the capturing position Ca.

The feature point detection unit 102 of the initial map generation unit 100a detects a feature point from the first captured image (step S102). The 3D distance image acquisition unit 105 of the initial map generation unit 100a acquires a three-dimensional distance image (step S103).

The image acquisition unit 101 acquires a second captured image (step S104). For example, the second captured image corresponds to a captured image taken by the camera 50a at the capturing position Cb. The feature point detection unit 102 detects feature points from the second captured image (step S105).

The feature point matching processing unit 103 of the initial map generation unit 100a performs matching the feature points of the two captured images (step S106). The feature point stereo processing unit 104 of the initial map generation unit 100a calculates the three-dimensional coordinates of map points (the second map points) by the stereo process (step S107)

The feature point three-dimensional coordinate acquisition unit 106 of the initial map generation unit 100a calculates the three-dimensional coordinates of map points (the first map points) from a 3D distance image (step S108). The map point generation unit 107 of the initial map generation unit 100a selects and organizes map points (step S109) and saves initial map information in the initial map storage unit 108 (step S110). For example, at step S109, the map point generation unit 107 generates the initial map information by prioritizing the first map points to the second map points.

Figure 8:
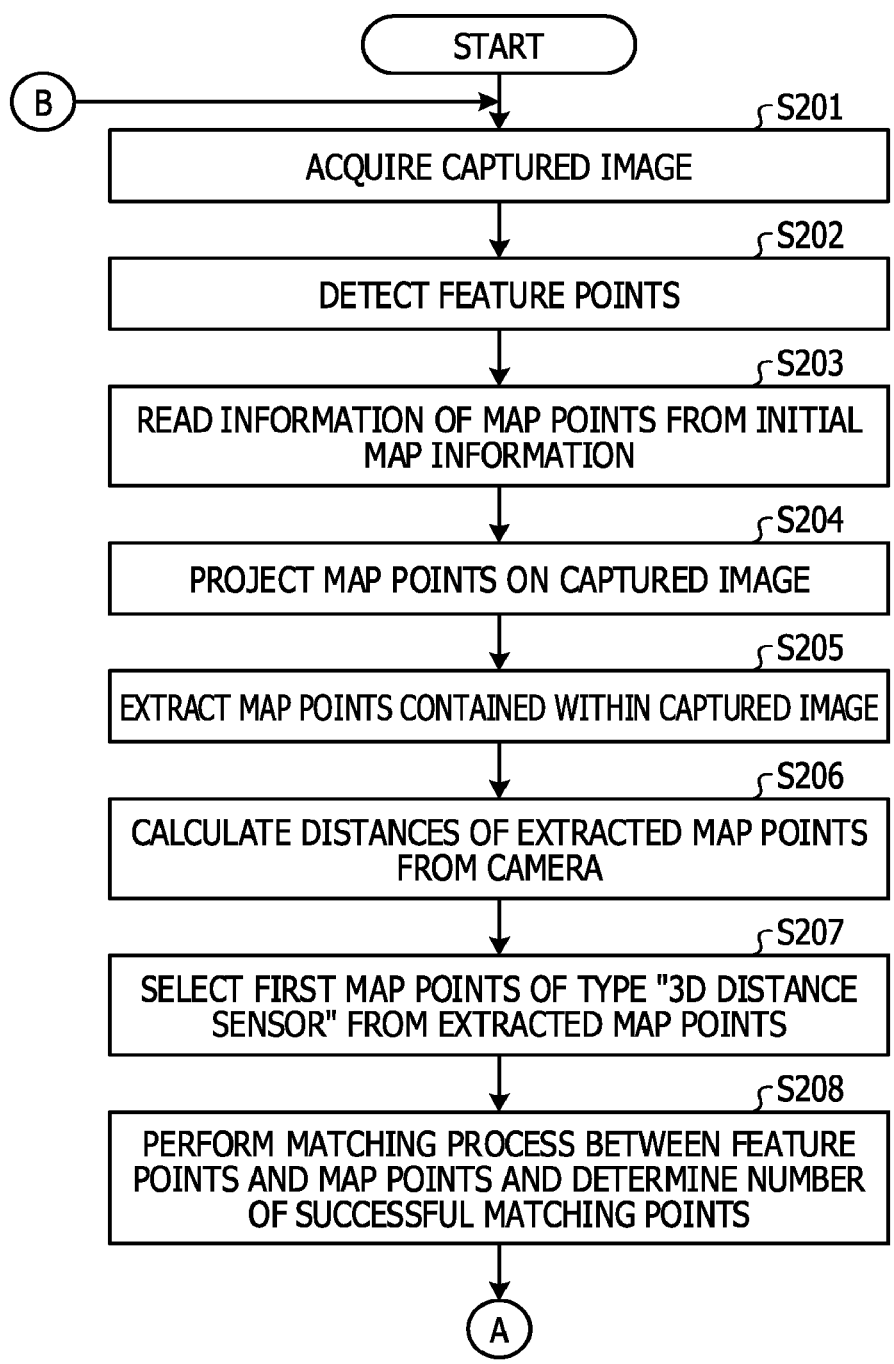
FIG. 8 is a flowchart (1) illustrating an operation procedure of the camera position and attitude estimation unit according to the present embodiment.
Figure 9:
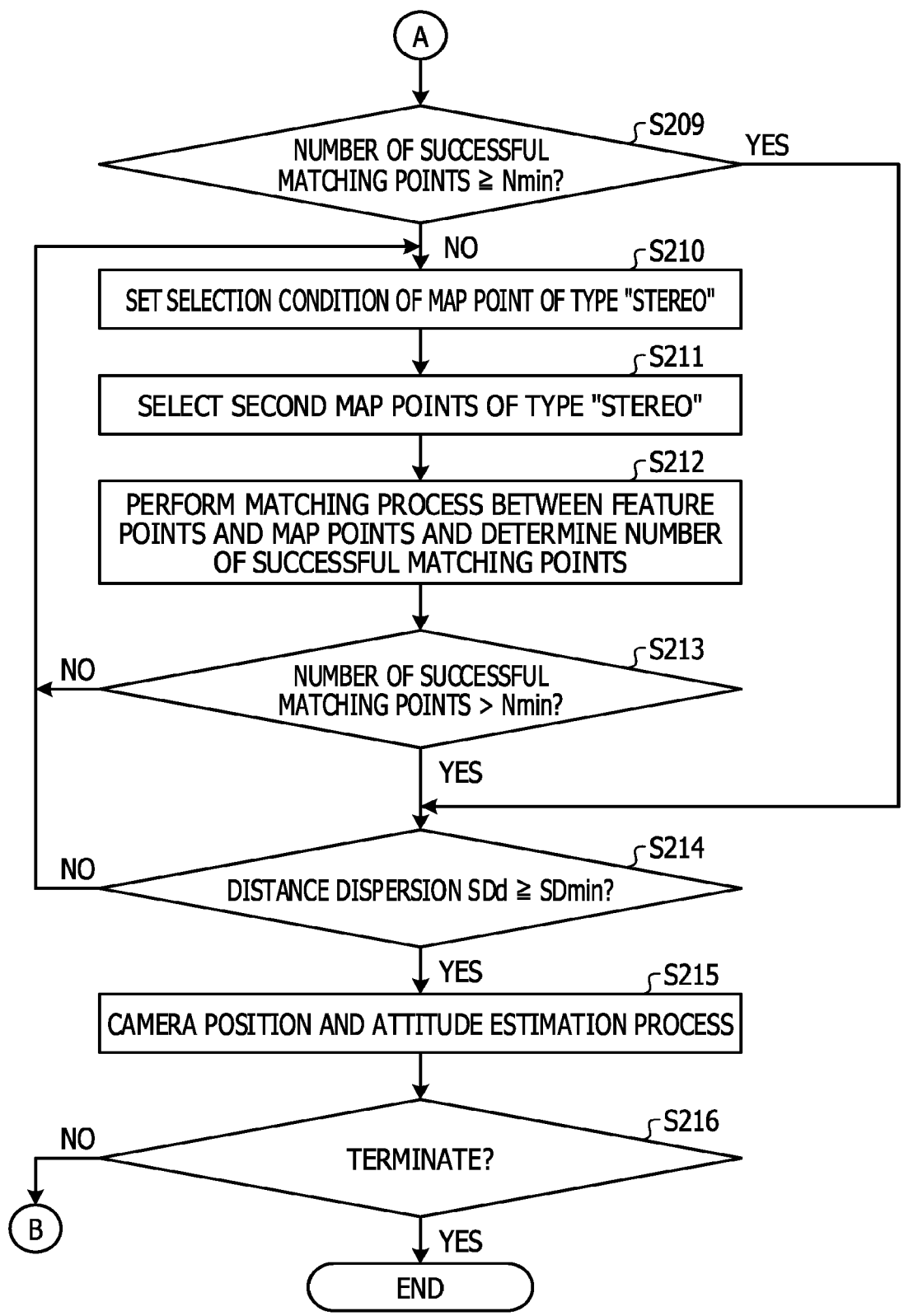
FIG. 9 is a flowchart (2) illustrating an operation procedure of the camera position and attitude estimation unit according to the present embodiment.

Next, an operation procedure of the camera position and attitude estimation unit 100b according to the present embodiment will be described. FIG. 8 and FIG. 9 are flowcharts illustrating the operation procedure of the camera position attitude estimation unit according to the present embodiment. As illustrated in FIG. 8, the image acquisition unit 210 of the camera position and attitude estimation unit 100b acquires a captured image (step S201). The feature point detection unit 231 of the camera position and attitude estimation unit 100b detects feature points (step S202).

The map point projection unit 232 of the camera position and attitude estimation unit 100b reads information of map points from initial map information (step S203) and projects the map points on the captured image (step S204). The map point projection unit 232 extracts map points which are contained within the captured image (step S205).

The map point usage condition setting unit 233 of the camera position and attitude estimation unit 100b calculates the distance of the extracted map points from the camera (steps S206). The map point usage condition setting unit 233 selects the first map points of the type "3D distance sensor" from the extracted map points (step S207). The matching processing unit 234 of the camera position and attitude estimation unit 100b performs a matching process between feature points and map points (projection points). Further, the matching result determination unit 235 of the camera position and attitude estimation unit 100b determines the number of successful matching points (step S208) and moves onto step S209 of FIG. 9.

FIG. 9 will be described. The matching result determination unit 235 determines whether or not the number of successful matching points is greater than or equal to $N_{min}$ (step S209). If the number of successful matching points is greater than or equal to $N_{min}$ (step S209, Yes), the matching result determination unit 235 moves onto step S214. On the other hand, if the number of successful matching points is not greater than or equal to $N_{min}$ (step S209, No), the matching result determination unit 235 moves onto step S210.

The map point usage condition setting unit 233 sets a selection condition of map points for the type "stereo" (step S210). At step S210, for example, the map point usage condition setting unit 233 sets the second selection condition or the third selection condition. The map point usage condition setting unit 233 selects the second map points of the type "stereo" (step S211).

The matching processing unit 234 performs a matching process between feature points and map points, and the matching result determination unit 235 determines the number of successful matching points (step S212).

The matching result determination unit 235 determines whether or not the number of successful matching points is greater than or equal to $N_{min}$ (step S213). If the number of successful matching points is greater than or equal to $N_{min}$ (step S213, Yes), the matching result determination unit 235 moves onto step S214. On the other hand, if the number of successful matching points is not greater than or equal to $N_{min}$ (step S213, No), the matching result determination unit 235 moves onto step S210.

The matching result determination unit 235 determines whether or not the distance dispersion SDd is greater than or equal to $SD_{min}$ (step S214). If the distance dispersion SDd is greater than or equal to $SD_{min}$ (step S214, Yes), the matching result determination unit 235 moves onto step S215. On the other hand, if the distance dispersion SDd is not greater than or equal to $SD_{min}$ (step S214, No), the matching result determination unit 235 moves onto step S210.

The position and attitude estimation unit 240 of the camera position and attitude estimation unit 100b estimates the position and attitude of a camera (step S215). The camera position and attitude estimation unit 100b determines whether or not to terminate the process (step S216). If terminating the process (step S216, Yes), the camera position and attitude estimation unit 100b terminates the process. On the other hand, if not terminating the process (step S216, No), the camera position and attitude estimation unit 100b moves onto step S201 of FIG. 8.

Next, advantages of the image processing device 100 according to the present embodiment will be described. The image processing device 100 performs a matching process between the first map points acquired by the 3D distance sensor 50b and feature points in a captured image. When the number of successful matching counts is insufficient, the image processing device 100 adds the second map points calculated by the principle of stereo capturing to compensate the deficiency in the successful matching counts and estimates the position and attitude of the camera 50a. In general, because the first map points have a higher accuracy in three-dimensional coordinates than the second map points, the estimation accuracy of the position and attitude of a camera can be improved by selecting the information of the first map points prior to the information of the second map points.

In the image processing device 100, the initial map generation unit 100a maintains information of the first map points prior to information of the second map points as initial map information. In general, because the first map points have a higher accuracy in three-dimensional coordinates than the second map points, the accuracy can be improved by estimating the position and attitude of a camera by using such initial map information.

When selecting map points, the image processing device 100 prioritizes and selects map points closer to the camera 50a and performs matching between feature points and projection points obtained by projecting the selected map points on a captured image. Since it can be said that the map points closer to the camera 50a at the time of capturing are of higher detection accuracy, the estimation accuracy of the position and attitude of a camera is improved by prioritizing and selecting map points closer to the camera 50a.

The image processing device 100 selects map points based on a condition that a distribution state of map points projected on a captured image is greater than a threshold, and performs matching between feature points and projection points obtained by projecting the selected map points on a captured image. Since a wider expansion of the distribution of map points improves the estimation accuracy of the position and attitude of a camera, the estimation accuracy of the position and attitude is improved by utilizing a condition that the distribution state of map points is greater than a threshold.

Note that, when the number of map points whose three-dimensional coordinate values have been obtained by using the 3D distance sensor 50b is too large, there is a likelihood that such too many map points may include map points which are relatively distant from a camera and include a larger error and therefore the estimation accuracy of the camera position and attitude may relatively decrease. In such a case, although the number of map points to be used can be reduced, the camera position and attitude estimation unit 100b may exclude such map points with priority that are distant from a camera at the time of capturing so as to select map points as many as possible which include a smaller error.

Figure 10:
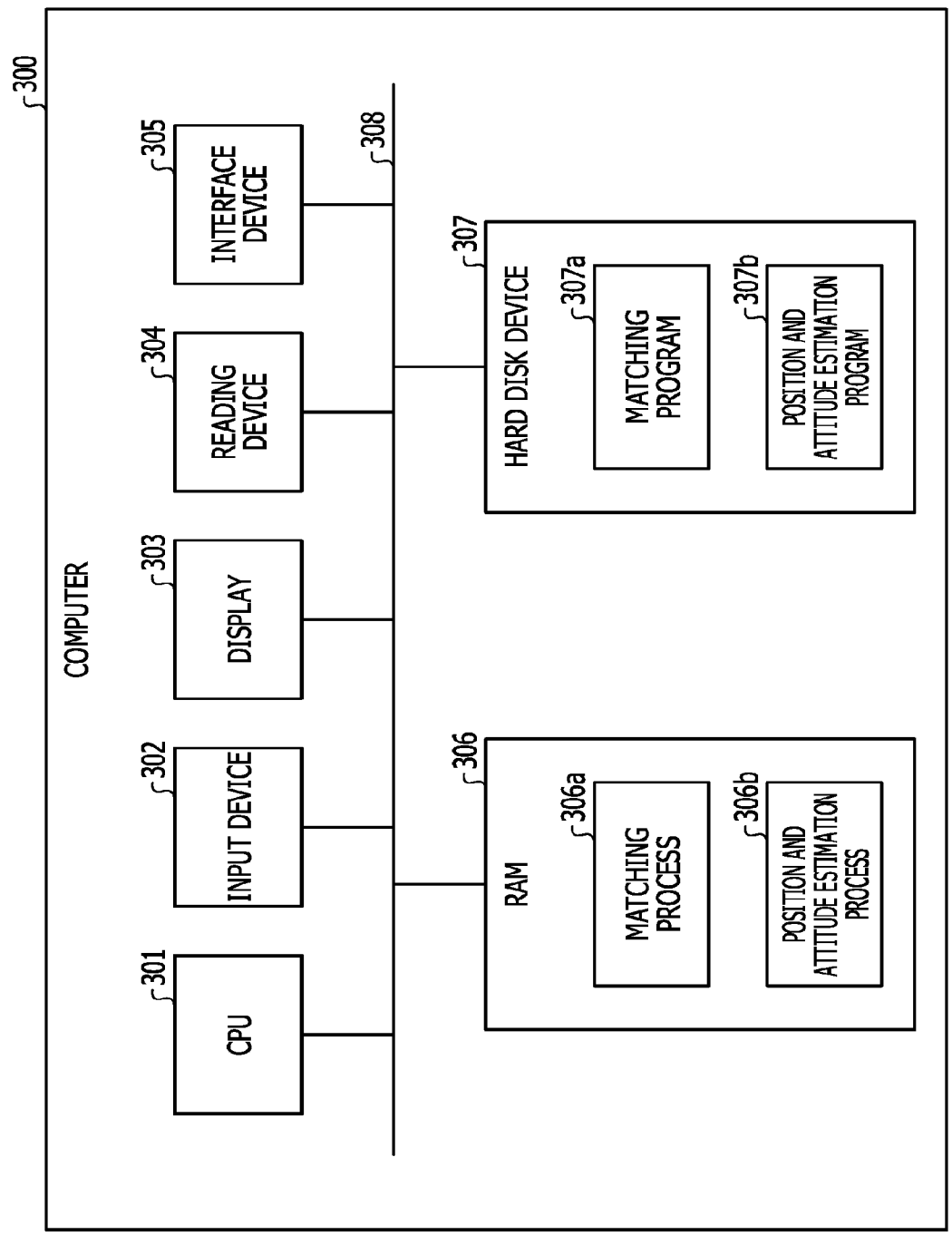
FIG. 10 is a diagram illustrating an example of a computer that executes an image processing program.
Figure 11:
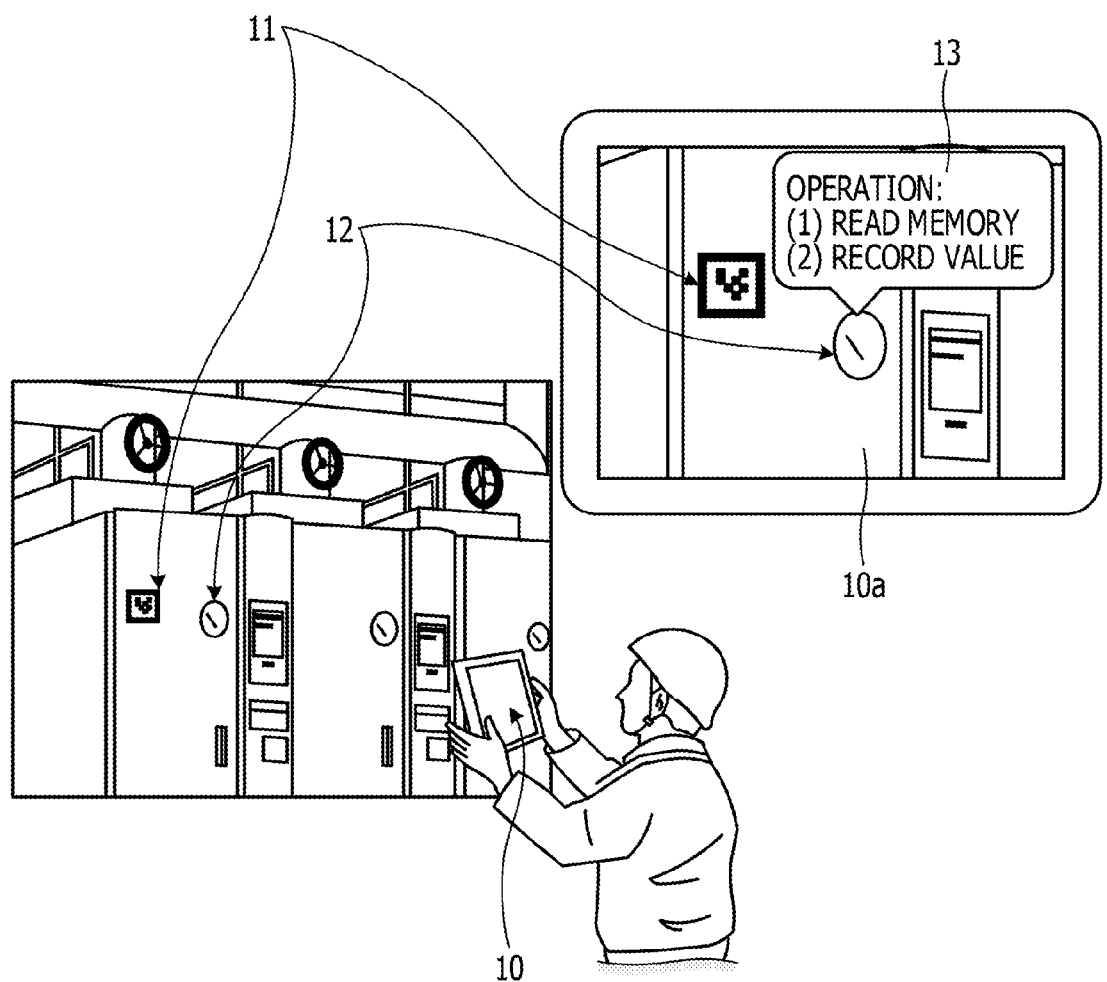
FIG. 11 is a diagram illustrating an example of the AR technology.
Figure 12:
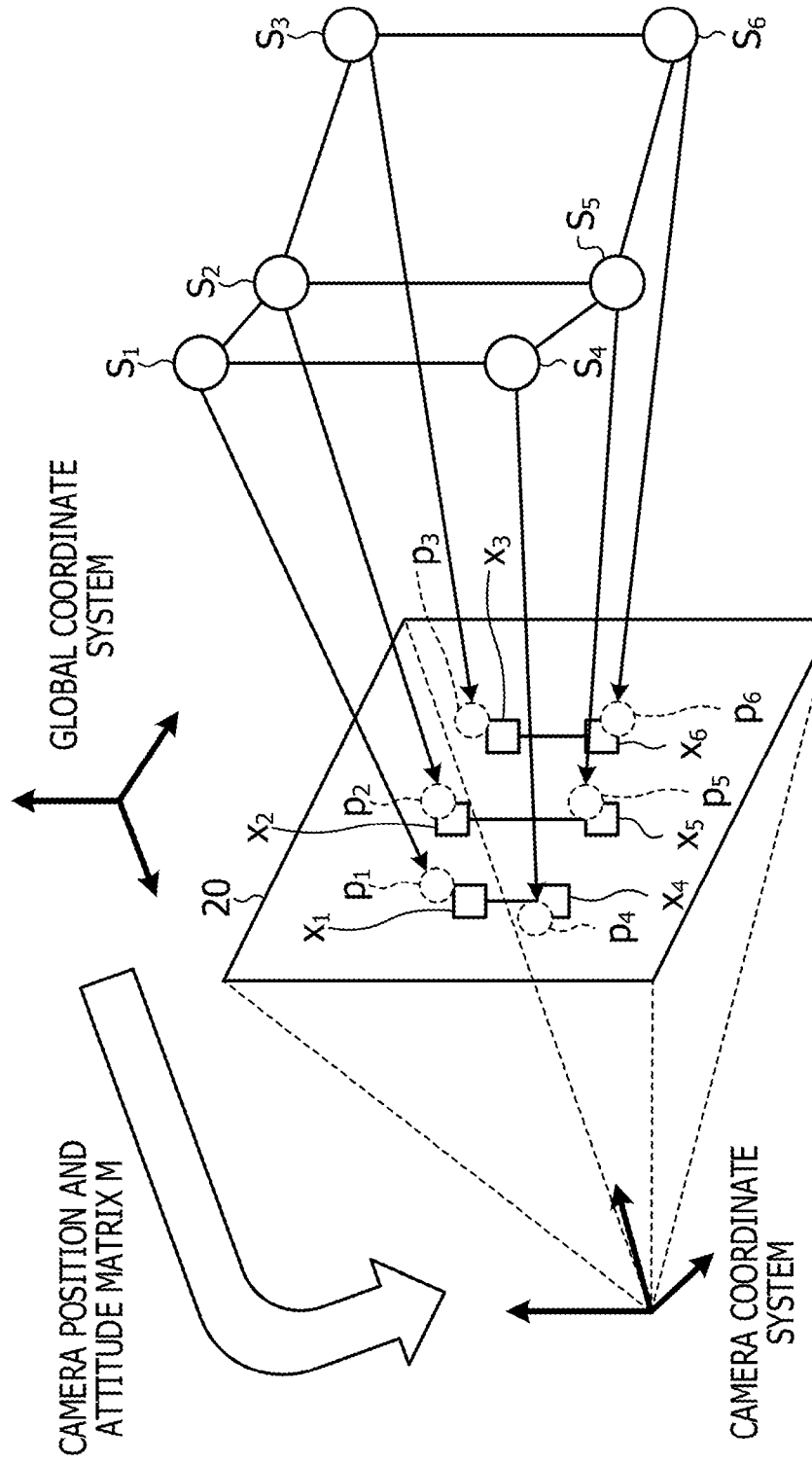
FIG. 12 is a diagram for illustrating the first conventional art that calculates a position and attitude of a camera.
Figure 13:
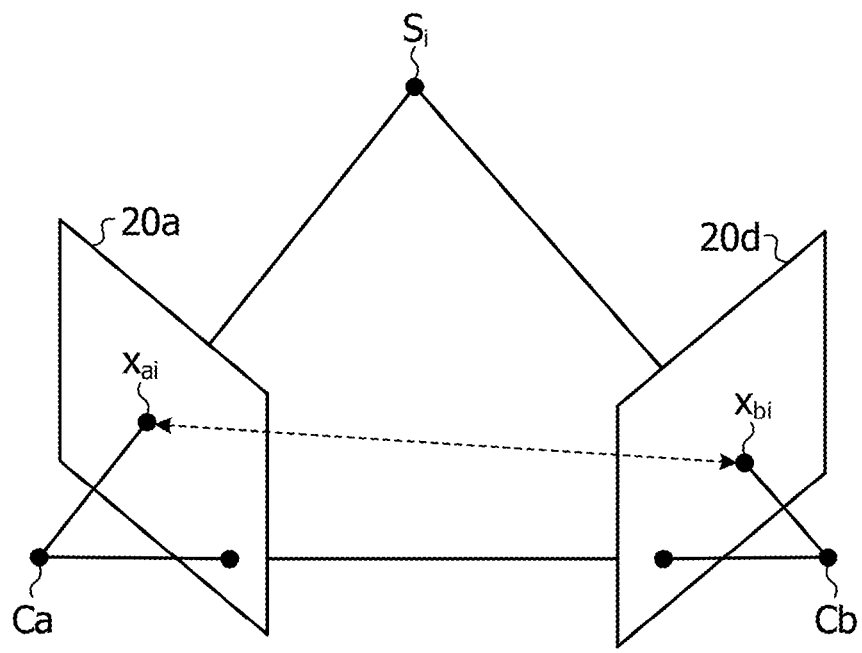
FIG. 13 is a diagram for illustrating the first conventional art that generates an initial map.
Figure 14:
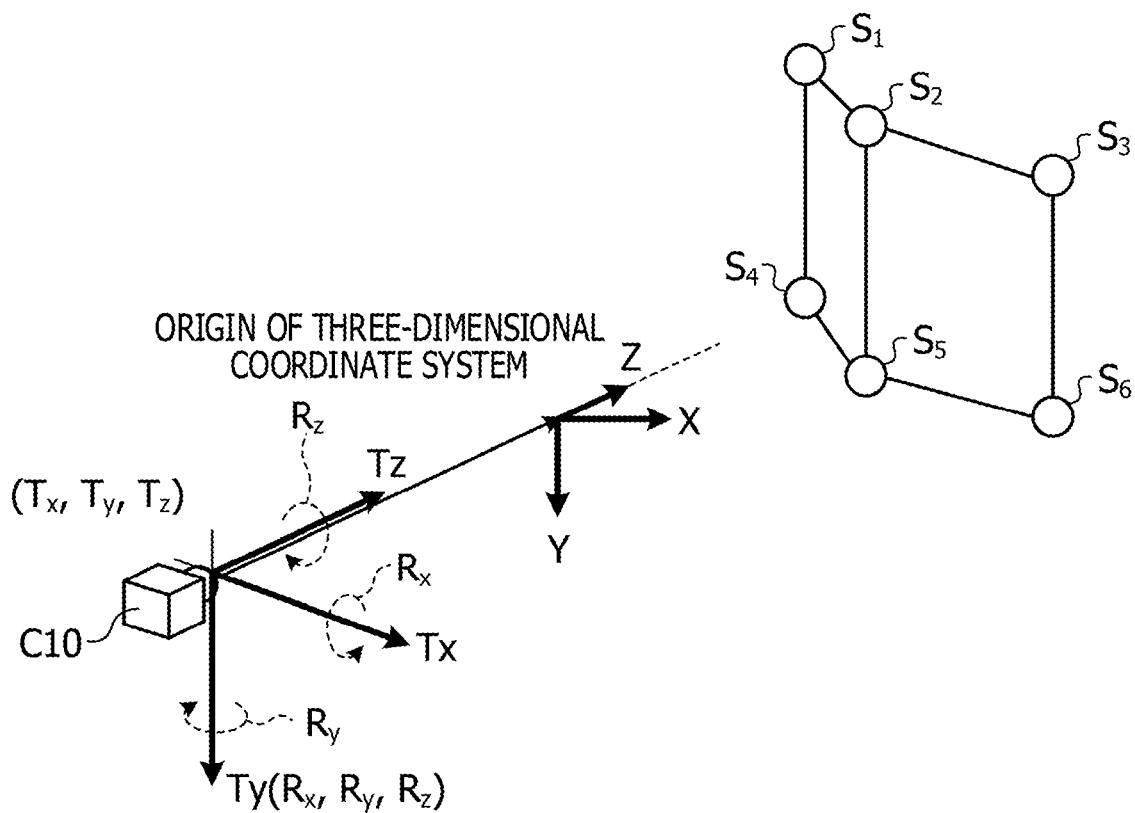
FIG. 14 is a diagram illustrating an example of a definition of a capturing orientation of a camera.

Next, an example of a computer that executes an image processing program that realizes the same functions as the image processing device 100 illustrated in the embodiment described above will be described. FIG. 10 is a diagram illustrating an example of a computer that executes an image processing program.

As illustrated in FIG. 10, a computer 300 has a CPU 301 that executes various operating processes, an input device 302 that accepts data input from a user, and a display 303. Further, the computer 300 has a reading device 304 that reads a program and the like from a storage medium and an interface device 305 that transacts data with another computer via a network. Further, the computer 300 has a RAM 306 that temporarily stores various information and a hard disk device 307. Further, each of the devices 301 to 307 is connected to a bus 308.

The hard disk device 307 has a matching program 307a and a position and attitude estimation program 307b. The CPU 301 reads the matching program 307a and the position and attitude estimation program 307b and expands it to the RAM 306. The matching program 307a functions as a matching process 306a. The position and attitude estimation program 307b functions as a position and attitude estimation process 306b.

Note that, the matching program 307a and the position and attitude estimation program 307b may not necessarily be stored in advance in the hard disk device 307. For example, each program may be stored in advance in "portable physical medium" such as a flexible disk (FD), a CD-ROM, a DVD disc, an optical magnetic disk, an IC card, or the like that may be inserted in the computer 300. Then, the computer 300 may read and execute the matching program 307a and the position and attitude estimation program 307b.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An image processing device comprising:
a memory configured to store map point information including a first map point group indicating a three-dimensional position of an object measured by a distance sensor and a second map point group indicating a three-dimensional position of the object determined based on a plurality of captured images; and
a processor coupled to the memory and configured to:
acquire a new captured image including the object,
compare a first projection point group with a feature point group extracted from the new captured image, the first projection point group being obtained by projecting the first map point group on the new captured image,
create pairs of a feature point in the feature point group and a first projection point that is similar to the feature point,
when the number of the pairs is less than or equal to a threshold, compare a second projection point group with the feature point group, the second projection point group being obtained by projecting the second map point group on the new captured image,
create other pairs of the feature point and a second projection point that is similar to the feature point, and
estimate a position and attitude of a camera that has captured the new captured image based on the pairs, the other pairs, and the map point information.

2. The image processing device according to claim 1, wherein the map point information is generated by prioritizing information measured by the distance sensor to information determined based on the plurality of captured images.

3. The image processing device according to claim 1, wherein the processor is configured to create the other pairs by prioritizing second map points closer to the camera in the second map point group when the number of the pairs is less than or equal to the threshold.

4. The image processing device according to claim 1, wherein for an area where distribution of the first projection point group is less, the processor is configured to select the second map point group projected on the area so that the first projection point group and the second projection point group are distributed in a wide range on the new captured image.

5. The image processing device according to claim 1, wherein object information is displayed on the new captured image based on the result.

6. The image processing device according to claim 5, wherein the object information is an augmented reality (AR) content.

7. An image processing method executed by a computer, the image processing method comprising:
storing, into a memory, map point information including a first map point group indicating a three-dimensional position of an object measured by a distance sensor and a second map point group indicating a three-dimensional position of the object determined based on a plurality of captured images;
acquiring a new captured image including the object;
comparing a first projection point group with a feature point group extracted from the new captured image, the first projection point group being obtained by projecting the first map point group on the new captured image;
creating pairs of a feature point in the feature point group and a first projection point that is similar to the feature point;
when the number of the pairs is less than or equal to a threshold, comparing a second projection point group with the feature point group, the second projection point group being obtained by projecting the second map point group on the new captured image;
creating other pairs of the feature point and a second projection point that is similar to the feature point; and
estimating a position and attitude of a camera that has captured the new captured image based on the pairs, the other pairs, and the map point information.

8. The image processing method according to claim 7, wherein the map point information is generated by prioritizing information measured by the distance sensor to information determined based on the plurality of captured images.

9. The image processing method according to claim 7, wherein the other pairs is created by prioritizing second map points closer to the camera in the second map point group when the number of the pairs is less than or equal to the threshold.

10. The image processing method according to claim 7, wherein for an area where distribution of the first projection point group is less, the second map point group projected on the area is selected so that the first projection point group and the second projection point group are distributed in a wide range on the new captured image.

11. The image processing method according to claim 7, wherein object information is displayed on the new captured image based on the result.

12. The image processing method according to claim 11, wherein the object information is an augmented reality (AR) content.

13. A non-transitory computer-readable storage medium storing an image processing program for causing a computer to execute a process, the process comprising:
storing, into a memory, map point information including a first map point group indicating a three-dimensional position of an object measured by a distance sensor and a second map point group indicating a three-dimensional position of the object determined based on a plurality of captured images;
acquiring a new captured image including the object;
comparing a first projection point group with a feature point group extracted from the new captured image, the first projection point group being obtained by projecting the first map point group on the new captured image;
creating pairs of a feature point in the feature point group and a first projection point that is similar to the feature point;
when the number of the pairs is less than or equal to a threshold, comparing a second projection point group with the feature point group, the second projection point group being obtained by projecting the second map point group on the new captured image;
creating other pairs of the feature point and a second projection point that is similar to the feature point; and
estimating a position and attitude of a camera that has captured the new captured image based on the pairs, the other pairs, and the map point information.

14. The non-transitory computer-readable storage medium according to claim 13, wherein the map point information is generated by prioritizing information measured by the distance sensor to information determined based on the plurality of captured images.

15. The non-transitory computer-readable storage medium according to claim 13, wherein the other pairs is created by prioritizing second map points closer to the camera in the second map point group when the number of the pairs is less than or equal to the threshold.

16. The non-transitory computer-readable storage medium according to claim 13, wherein for an area where distribution of the first projection point group is less, the second map point group projected on the area is selected so that the first projection point group and the second projection point group are distributed in a wide range on the new captured image.

17. The non-transitory computer-readable storage medium according to claim 13, wherein object information is displayed on the new captured image based on the result.

18. The non-transitory computer-readable storage medium according to claim 17, wherein the object information is an augmented reality (AR) content.

* * * * *